US009862125B2

(12) United States Patent
Birka

(10) Patent No.: US 9,862,125 B2
(45) Date of Patent: Jan. 9, 2018

(54) CO-INJECTION MOLDING OF THE STRUCTURAL PORTION OF A VEHICLE LIFTGATE INNER PANEL

(71) Applicant: Magna International Inc., Aurora (CA)

(72) Inventor: Mark P. Birka, Northville, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 154 days.

(21) Appl. No.: 14/436,708

(22) PCT Filed: Oct. 18, 2013

(86) PCT No.: PCT/IB2013/003045
§ 371 (c)(1),
(2) Date: Apr. 17, 2015

(87) PCT Pub. No.: WO2014/091305
PCT Pub. Date: Jun. 19, 2014

(65) Prior Publication Data
US 2016/0167262 A1  Jun. 16, 2016

Related U.S. Application Data

(60) Provisional application No. 61/716,095, filed on Oct. 19, 2012.

(51) Int. Cl.
B29C 44/08 (2006.01)
B32B 5/20 (2006.01)
(Continued)

(52) U.S. Cl.
CPC ............ *B29C 44/08* (2013.01); *B29C 44/586* (2013.01); *B29C 45/1642* (2013.01); *B32B 5/20* (2013.01);
(Continued)

(58) Field of Classification Search
None
See application file for complete search history.

(56) References Cited

U.S. PATENT DOCUMENTS 4,025,686 A * 5/1977 Zion ..................... B29C 70/025
428/309.9
5,236,976 A * 8/1993 Michaels ................. C08K 3/22
523/514
(Continued)

FOREIGN PATENT DOCUMENTS

EP  0540941 A1   5/1993
EP  0919351 A2 *  6/1999 ........... B29C 44/586
(Continued)

OTHER PUBLICATIONS

Supplementary European International Search Report for International Application PCT/IB2013/003045, dated Oct. 5, 2015.
(Continued)

*Primary Examiner* — David Sample
*Assistant Examiner* — Donald M Flores, Jr.
(74) *Attorney, Agent, or Firm* — Warn Partners, P.C.

(57) ABSTRACT

A thermoplastic liftgate inner panel construction is provided by using a co-injected injection molding process. In a first phase, a class A surface material is injected into the molds and thereafter in a second phase an inner core of material is injected using a gas-infused reinforced polymer.

6 Claims, 4 Drawing Sheets

(51) Int. Cl.
    *B32B 27/08* (2006.01)
    *B32B 27/32* (2006.01)
    *B62D 33/027* (2006.01)
    *B32B 27/20* (2006.01)
    *B32B 27/06* (2006.01)
    *B29C 45/16* (2006.01)
    *B60J 5/10* (2006.01)
    *B29C 44/58* (2006.01)
    *B29L 31/30* (2006.01)
    *B29K 105/04* (2006.01)
    *B29K 101/12* (2006.01)
    *B29K 105/12* (2006.01)
    *B29K 309/08* (2006.01)

(52) U.S. Cl.
    CPC ............ *B32B 27/065* (2013.01); *B32B 27/08* (2013.01); *B32B 27/20* (2013.01); *B32B 27/32* (2013.01); *B60J 5/10* (2013.01); *B62D 33/0273* (2013.01); *B29K 2101/12* (2013.01); *B29K 2105/04* (2013.01); *B29K 2105/041* (2013.01); *B29K 2105/12* (2013.01); *B29K 2309/08* (2013.01); *B29L 2031/3005* (2013.01); *B29L 2031/3041* (2013.01); *B32B 2262/101* (2013.01); *B32B 2266/0214* (2013.01); *B32B 2605/08* (2013.01); *B32B 2607/00* (2013.01); *B60J 5/107* (2013.01)

(56) References Cited

U.S. PATENT DOCUMENTS

| | | | | |
|---|---|---|---|---|
| 6,060,004 A | * | 5/2000 | Takeuchi | B29C 45/1642 264/255 |
| 6,068,807 A | * | 5/2000 | Takeuchi | B29C 45/1642 264/255 |
| 6,180,042 B1 | * | 1/2001 | Takeuchi | B29C 45/1642 264/255 |
| 6,998,174 B2 | * | 2/2006 | Porter | B29C 45/1642 428/318.8 |
| 7,846,533 B2 | * | 12/2010 | Zawacki | B29C 44/0415 428/156 |
| 2003/0211307 A1 | * | 11/2003 | Porter | B29C 45/1642 428/313.3 |
| 2003/0211311 A1 | * | 11/2003 | Porter | B29C 45/1642 428/318.8 |
| 2004/0041429 A1 | * | 3/2004 | McLaren | B62D 25/06 296/57.1 |
| 2009/0029143 A1 | * | 1/2009 | Kanae | B29C 44/586 428/315.5 |
| 2011/0052899 A1 | * | 3/2011 | Mozer | B29C 44/0415 428/304.4 |
| 2011/0074179 A1 | | 3/2011 | Kuntze et al. | |
| 2011/0121547 A1 | | 5/2011 | Nogaret et al. | |

FOREIGN PATENT DOCUMENTS

| | | | | |
|---|---|---|---|---|
| EP | 1510322 A1 | | 3/2005 | |
| EP | 2149443 A1 | * | 2/2010 | ......... B29C 45/1642 |
| JP | 2001162650 A | | 6/2001 | |
| JP | 2002172651 A | | 6/2002 | |
| JP | 2011046011 A | | 3/2011 | |
| WO | 2011009745 A1 | | 1/2011 | |

OTHER PUBLICATIONS

International Search Report and Written Opinion for International Application No. PCT/IB2013/003045, dated Jul. 25, 2014.

* cited by examiner

CO-INJECTION MOLDING OF THE STRUCTURAL PORTION OF A VEHICLE LIFTGATE INNER PANEL

CROSS REFERENCE TO RELATED APPLICATIONS

This application is a National Stage of International Application No. PCT/IB2013/003045, filed Oct. 18, 2013. This application claims priority to U.S. Provisional Patent Application No. 61/716,095 filed on Oct. 19, 2012. The disclosure(s) of the above application(s) is (are) incorporated herein by reference.

TECHNICAL FIELD

The present invention relates to a thermoplastic vehicle body closure panel and method of manufacture.

BACKGROUND OF THE INVENTION

One of the current trends in the automobile industry is to lower vehicle weight to help achieve better fuel economy, thus helping to meet fuel economy standards and to offset the higher fuel prices. Another trend is that there is a broader range of vehicle models, which in turn reduces the volume of vehicles produced on a per model basis.

SUV vehicles remain popular and typically include fairly heavy rear liftgates making this part of the vehicle a target area for weight reduction. Liftgates are traditionally made from stamped steel panels that are heavy and have a high tooling cost. Sheet Molding Compound (SMC) is an alternative to steel for the inner and outer panels of the liftgate. Using SMC has several manufacturing concerns related to the material and process. Steel and SMC liftgates have a mass penalty over thermoplastics. There are also styling restrictions with traditional sheet metal components. Thermoplastic composite type materials used for liftgate applications also have difficulty meeting customer performance specifications.

Another concern with the manufacture of liftgates is that typical liftgates are manufactured as a relatively flat or smoothly contoured panel, with structural reinforcements such as ribs being added onto the panel. This will also add weight and increase manufacturing complexity as well and if thermoplastics are used there are read through areas where the ribs are placed which must be dealt with by design modifications or expensive processes such as gas assist injection molding.

Recently magnesium inner reinforcement panels have been used with an outer polymer skin in order to reduce weight. While such panels are an improvement in weight, this is an expensive solution. Accordingly, there exists a need for a composite liftgate which is both lightweight, as well as structurally sound enough to meet various load requirements, while being more mass and cost effective than magnesium reinforced liftgates.

SUMMARY OF THE INVENTION

In accordance with the present invention, a thermoplastic vehicle body closure panel construction is provided by using a co-injected injection molding process. In a first phase, a class A surface material is injected into the mold, and thereafter, in a second phase an inner core of material is injected using a gas-infused reinforced polymer. In a preferred embodiment the mold is allowed to expand in a controlled parallel retraction after the second injection to allow a final uniform expanded part thickness.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
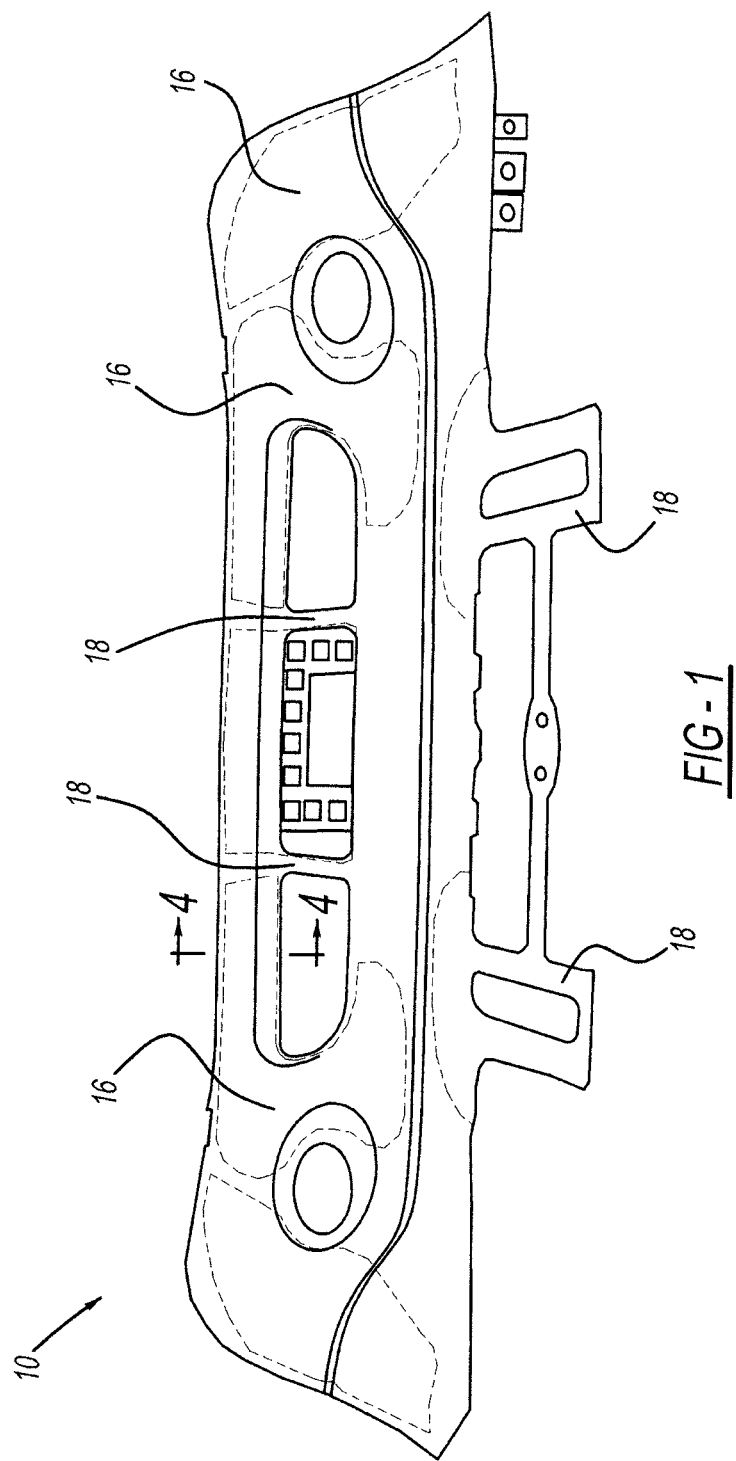
FIG. 1 is an perspective view showing vehicle body closure panel in the form of a liftgate according to the present invention.
Figure 2:
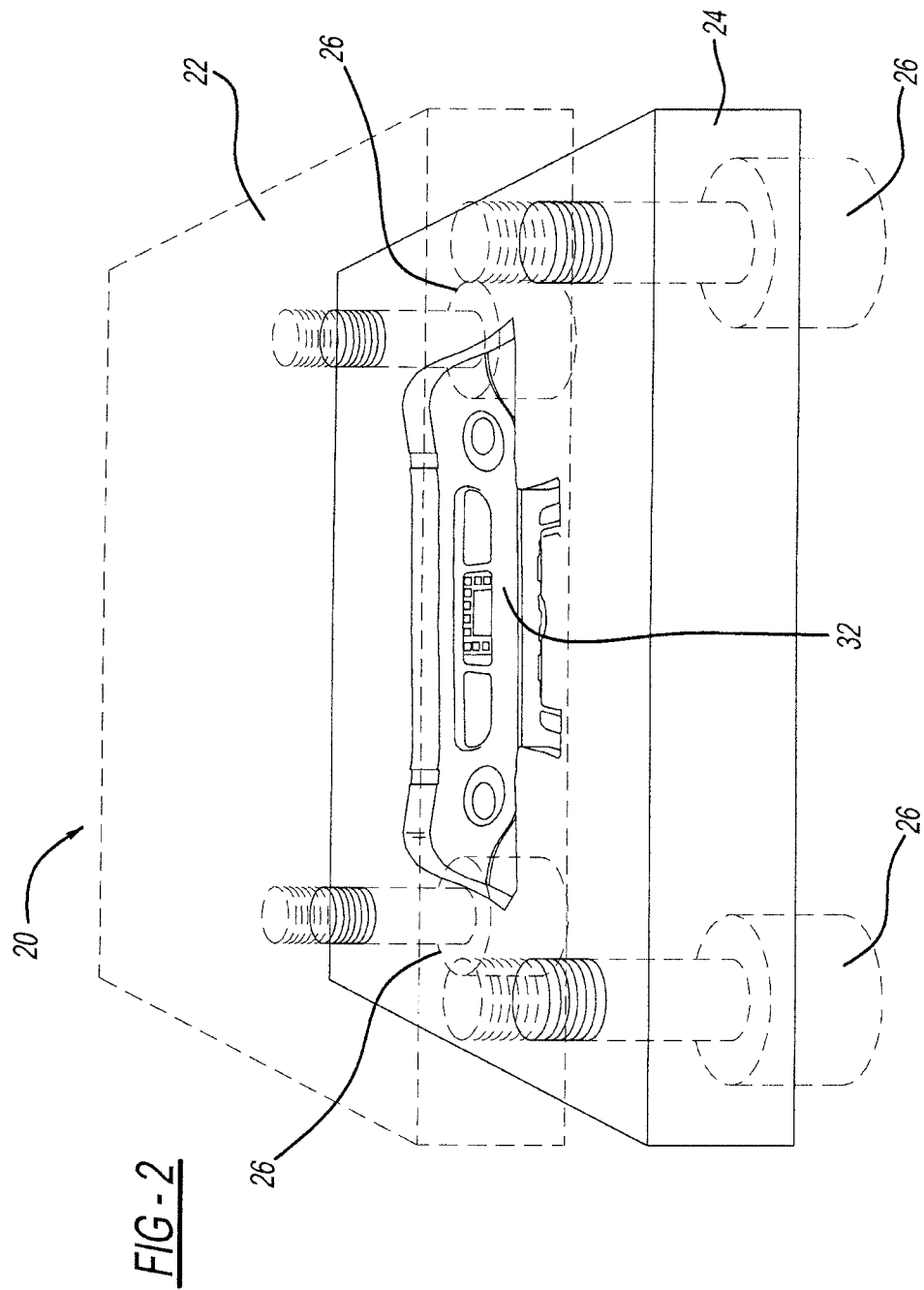
FIG. 2 is a perspective view, partially in phantom, showing a mold with for corner leveling for use in the present invention.
Figure 3:
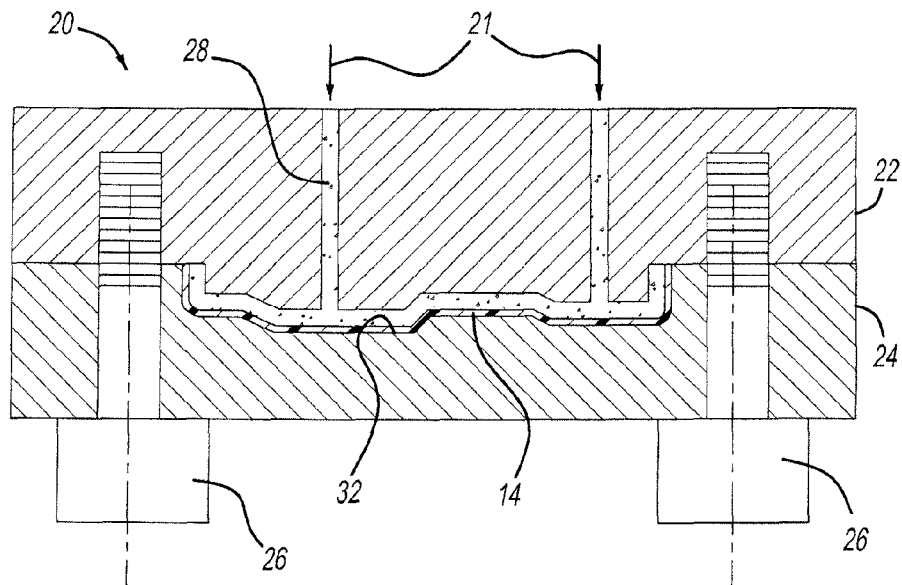
FIG. 3 is a sectional view showing the first shot position of the mold of FIG. 3 in the mold close position for forming of a molded vehicle body closure panel shown in the form of a gas reinforced polymer liftgate in accordance with the teachings of the present invention.

The following description of the preferred embodiment(s) is merely exemplary in nature and is in no way intended to limit the invention, its application, or uses.

Referring now to the Figures, there is provided a molded closure body panel such as a liftgate inner panel generally shown at 10. A paintable or otherwise Class A surface moldable "virgin" material is injected into a mold of the liftgate inner panel and thereafter a second long glass fiber thermoplastic is injected for forming a core using a microcellular foam process for injection of supercritical fluid and atmospheric gas though injectors in the mold. The thermoplastic material used in forming the core of this process is a glass filled structural thermoplastic polyolefin. The polyolefin is 30% to 40% filled with 12 mm glass fibers which are reduced to from about 1-4 mm length fibers during the injection process. Therefore, the final product produced includes a virgin polymer show surface layer, also referred to herein as an outer skin 14 and the core includes a resin and glass rich outer layer area 14a and an expanded reinforced central area 14b. Typically, rapid dissolution of the supercritical fluid provides microcellular pockets 12 in the core of the part. The outer skin 14 is a thinner, higher density wall of solid thermoplastic material 14. The resulting structure is robust and is a weight and cost savings over even the magnesium reinforced parts of the prior art.

Figure 4B:
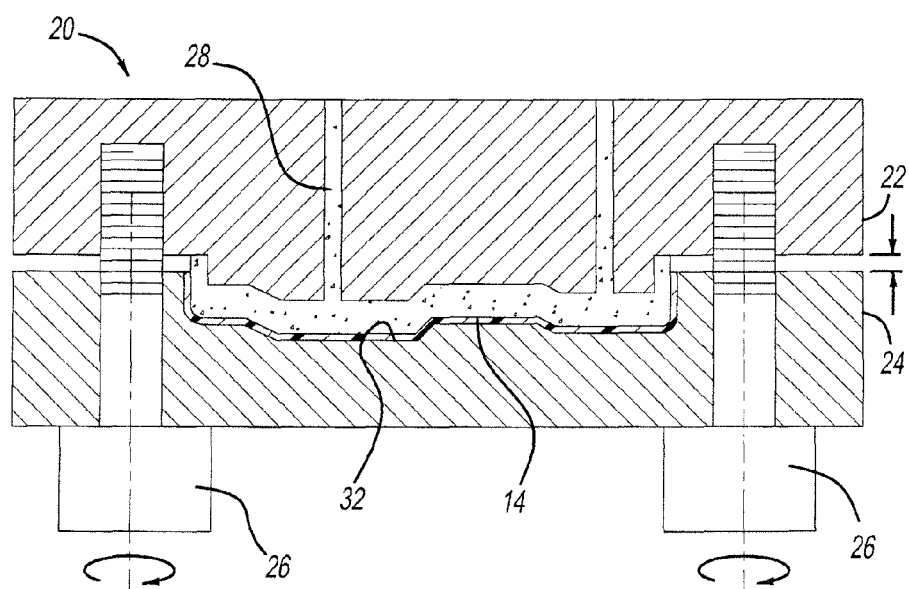
FIG. 4B is a sectional view of the mold of FIG. 2 showing the expanded part of FIG. 4 after controlled retraction of the mold to provide controlled expansion of the final molded vehicle body closure panel in the form of a gas reinforced polymer liftgate inner panel construction
Figure 4:
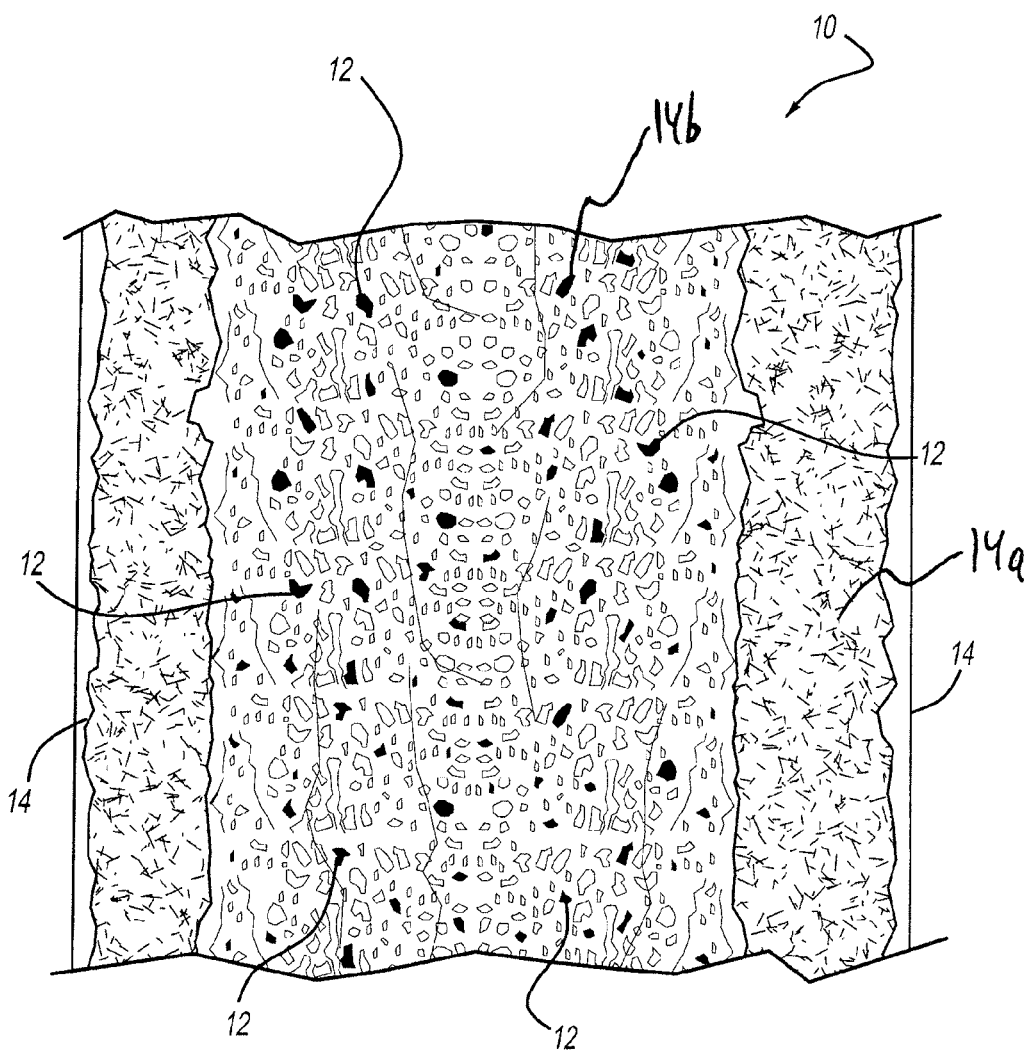
FIG. 4 is an illustrative view of a of the present invention showing the distribution of the gas reinforced core of the present invention.

Referring to FIG. 4, a typical foamed core reinforcement distribution can be seen. As shown in FIG. 4, the foam core injection is used for reinforcement in the structural areas 16 and attachment structural areas such as 18. In the present invention, a MuCell™ process licensed from Trexel, Inc. of Wilmington, Mass. is preferred. However, other foam processes, such as chemically expanding materials could also be utilized in the liftgate inner panel of the present invention. The use of this method provides a part with increased thickness and geometric strength at equivalent and reduced mass of prior liftgate constructions.

In the present application, the thickness of the liftgate inner panel is from about 5 to 6 mm thick. This is unlike traditional MuCell™ molded parts where thicknesses of no greater than 3 mm are taught and the process is used to reduce overall thickness of parts. The present inventive process provides extra strength when compared to metal reinforced liftgates while reducing overall weight by several pounds In operation, a sequential valve gate injection mold 20 is used with a two shot nozzle 21. The mold 20 provided includes a first mold half 22 and a second mold half 24. The first mold half 22 and second mold half 24 are operably configured to include a first closed under pressure configuration for providing and initial molding part dimension of 2-4 mm. The mold halves 22, 24 are connected to allow mold separation prior to curing of the materials and to provide four corner leveling of the mold by way of screws or rams 26 which are controlled preferably by a computer controller (not illustrated) to provide controlled parallel relative movement of the molds during release of mold pressure after the second shot is accomplished. Many vehicle closure body panel parts have various contours openings and gate or door hinge which would put varied forces in the lateral direction during expansion. The controlled retraction of the mold halves 22 and 24 is required to ensure the entire part thickness is uniform. In its simplest form the rams 26 are shown as threaded members which could be rotated at the same speed with motors chains gears or other drive mechanisms in order to provide for parallel movement between the two halves. One skilled in the art would recognize that hydraulic rams or the like could also be used without deviating from the scope of the present invention.

The mold 20 has at least one surface which includes a class A or show surface quality surface for providing the outside show surface of the liftgate inner panel. With the mold closed and clamped under initial injection molding pressure, a first valve gate 28 is provided for initially injecting a virgin show surface quality thermoplastic material into the mold 20. This molding step uses the temperature differential of the mold 24 which allows the molten polymer to coat the cooler outer mold surface first. A Virgin polymer material with typical colorants, and additives and minor amounts of fillers is used for forming the show surface. This material is preferably a mold in color thermoplastic polypropylene, or polyolefin, paintable thermoplastic polyolefin or other like materials. It is anticipated that certain ABS and nylon materials may be used if desired. The virgin polymer provides the outer skin 14 on the mold and a show surface on the final part. Thereafter, the valve gate 30 is sequenced such that a second shot is provided of the MuCell™ molding material. The MuCell™ process is used to fill the core to provide reinforcement to the outer show surface of the liftgate inner panel. Prior to solidification of the material the second mold half 24 is either drawn back or the pressure on this molding half is removed and the mold is allowed to retract from first mold half 22 parallel to the second mold half 24. The rams 26 provide four corner leveling between the mold halves 22 and 24 to the mold during retraction such that a uniform thickness of the part 10 is maintained during expansion. This provides the lightweight 5 to 6 mm "sandwich" internal structure of the liftgate inner panel. If necessary thicker sections may be used at attachment points and strengthening structures of the liftgate inner panel 10. The use of this process eliminates aberrations in injection molding of class A materials at locations of strengthening ribs and bosses which has been an ongoing problem in injection molding situations. A lightweight liftgate inner panel 10 substantially without metal reinforcements, or with very localized metal reinforcements, is provided by the present invention. Liftgate structures 10 of the present invention show 22% increases in torsional stiffness and 25% increases of latch pull strength, exceeding the performance of metal reinforced parts.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A liftgate inner panel comprising:
   at least one outer skin of the liftgate inner panel formed of a virgin material providing a class A surface;
   a plurality of structural areas of the liftgate inner panel, each of the plurality of structural areas include a core formed from a glass filled structural thermoplastic polyolefin, with a resin rich outer layer and an expanded reinforced central area, wherein the expanded reinforced central area is substantially filled with microcellular pockets for reducing weight and providing structural support and the resin rich outer layer is positioned between the at least one outer skin and the expanded reinforced central area;
   a plurality of attachment structures of the liftgate inner panel, each of the plurality of attachment structures include a core formed from a glass filled structural thermoplastic polyolefin, with a resin rich outer layer and an expanded reinforced central area, wherein the expanded reinforced central area is substantially filled with microcellular pockets for reducing weight and providing structural support and the resin rich outer layer is positioned between the at least one outer skin and the expanded reinforced central area;
   wherein the liftgate inner panel has contours and openings and the entire liftgate inner panel has a uniform thickness.

2. The liftgate inner panel of claim 1, wherein the uniform thickness of the entire liftgate inner panel has a thickness of from about 5 to 6 mm throughout.

3. The liftgate inner panel of claim 1, wherein the liftgate inner panel is selected from the group comprising an inner liftgate panel and a rear truck tailgate.

4. The liftgate inner panel of claim 1, wherein the glass filled structural thermoplastic polyolefin consists essentially of about 30% to about 40% glass fibers that are about 1 to 4 mm in length.

5. The liftgate inner panel of claim 1, wherein the glass filled structural thermoplastic polyolefin which is from about 30% to about 40% filled with 12 mm glass fibers which are reduced to from about 1 to 4 mm length fibers during an injection process.

6. The liftgate inner panel of claim 1, wherein the virgin material is one selected from the group consisting of thermoplastic polypropylene, polyolefin, paintable thermoplastic polyolefin, nylon material and acrylonitrile butadiene styrene.

\* \* \* \* \*